Patented Mar. 23, 1954

2,672,936

UNITED STATES PATENT OFFICE 2,672,936

FRACTURING ROCK FORMATIONS

Donald C. Bond, Crystal Lake, Ill., assignor to The Pure Oil Company, Chicago, Ill., a corporation of Ohio No Drawing. Application December 26, 1952,
Serial No. 328,143

11 Claims. (Cl. 166—21)

This invention relates to a method for increasing the permeability and porosity of siliceous geological formations traversed by a borehole. It is specifically concerned with a method which employs both acidization and hydraulic fracturing in a combination procedure which utilizes only a single treating agent.

A constantly occurring problem which has had the attention of fluid-production engineers is expediting the production of earth-bound fluids contained in subterranean reservoirs. Some wells produce fluids from reservoirs which have been so formed by nature as to permit the fluid to flow with a minimum of resistance to the borehole from whence it is transported to the surface. Very frequently however fluids are produced from so-called "tight" formations which must be treated to increase their permeability and/or porosity in order that the fluids contained therein may be made more accessible. Since this problem was first recognized there have been several techniques developed to attain this objective. The use of explosives and acid reagents both have been long employed to promote the flow of fluids from subterranean reservoirs. In the former method an explosive, such as nitroglycerine or dynamite, is placed adjacent to the formation which is to be shot. The explosive is detonated resulting in a disintegration of parts of the formation adjacent the borehole. In the latter method an acid which will react with the formation constituents is pumped into the formation through the walls of the well. As a result of the attendant reaction between the formation constituents and the acid treating agent, the formation surfaces contacted by the acid are leached out. Both of these methods increase the permeability of the formation and tend to increase production rate. As additional means for effecting the increase in the permeability of a formation there have been developed several other techniques whereby formations have been hydraulically fractured. In one such method a gelled oleaginous fluid is pumped into the formation being treated under sufficient pressure to overcome the overburden pressure and produce a fracture within the formation. The hydraulic fluid is then removed from within the formation by contacting it with a peptizing agent and removing it from the borehole in the form of a less viscous fluid. This technique is very adequately described in United States Patents 2,596,843, 2,596,844 and 2,596,845. In this method it is to be noted that the treating reagent employed is substantially inert with regard to the formation being treated and the only increase in permeability and porosity is effected by the fracturing of the formation which takes place. As a modification of this process, there has evolved the use of a gelled acid which is substituted for the inert oleaginous gel employed in the Hydrafrac process described in the foregoing patents. In this type of treatment the formation is initially fractured by utilizing the gelled acid as a hydraulic medium. After the formation fracturing has been effected the gelled acid, which has incorporated therein a peptizing reagent having a retarded reactivity which permits the gelled acid to be employed as a fracturing medium, reverts to the sol state without the need for contacting the gelled acid with an additional gel breaker solution and reacts with the formation to increase further the production rate thereof. The technique employed in carrying out this latter process is described in World Oil, 135 (5) 257, et seq. In each of these methods, which utilize hydraulic principles to increase production efficiency, it will be noted that a plurality of reagents is needed. Where the Hydrafrac technique is employed, it is necessary to prepare an oleaginous gel by the use of an oily liquid and a suitable gelling agent plus the additional requirement that a gel breaker solution, which is employed to reduce the viscosity of the oleaginous gel, must also be available. In using a gelled acid, it is also necessary that a suitable gelling agent be employed and that a gel breaker having a retarded activity also be incorporated into the composition. Thus the necessity for formulating these treating compositions at the site where the treatment is to be employed is disadvantageous especially where the ingredients of the composition are not all readily obtained and must be brought into the field in separate vehicular carriers.

It is therefore the primary object of this invention to provide a method for treating siliceous formations which utilizes both acidization and hydraulic fracturing to increase the production efficiency of fluid producing subterranean reservoirs. It is a further object of this invention to provide a method for stimulating the production of fluids from wells by the use of a simple treating reagent which does not require the need of a gelling agent to be incorporated in the treating solution which is employed to not only acidize but also hydraulically fracture siliceous formations.

In my copending application, Serial Number 323,603, filed December 2, 1952, I have disclosed and claimed the use of various fluophosphoric acids for decreasing the resistance to the flow of fluids produced from subterranean reservoirs. I have now discovered that this acidizing technique may be employed with modifications as a combination acidizing and hydraulic fracturing procedure. It has been discovered that when a fluophosphoric acid is contacted with silica there results a substantial increase in the viscosity of the spent acid. This is demonstrated in the table where it is shown in tabular summary the viscosities of various fresh and spent aqueous difluophosphoric acid solutions.

TABLE

*Viscosities of various aqueous di FP acid solutions (at 80° F.)*

| No. | Solution | Viscosity (centipoises) |
|---|---|---|
| 1 | 50% di FP acid | 3.7 |
| 2 | 40% di FP acid | 2.8 |
| 3 | 30% di FP acid | 2.0 |
| 4 | 20% di FP acid | 1.5 |
| 5 | 10% di FP acid | 1.2 |
| 6 | Spent 50% di FP acid [1] | 7.6 |
| 7 | Spent 40% di FP acid [1] | 4.8 |
| 8 | Spent 30% di FP acid [1] | 2.9 |
| 9 | Spent 20% di FP acid [1] | 1.7 |
| 10 | Spent 10% di FP acid [1] | 1.3 |
| 11 | Anhydrous di FP acid | 4.0 |

[1] Spent by reaction with silica.

Therefore, according to this invention, hydraulic fracturing of geological formations can be readily effected by employing a spent fluophosphoric acid as a fracturing medium. In carrying out this invention a sufficient quantity of an aqueous solution of a fluophosphoric acid is introduced into a siliceous formation in accordance with the technique described in my copending application. As a result of the interaction between the acid treating reagent and the siliceous components of the formation, there is effected a substantial increase in the permeability of the formation adjacent the borehole. The acidizing solution which becomes spent after being in contact with the sand from 1 minute to about 120 minutes or more, depending upon the surface area of the sand, remains in place in the formation and a sufficient pressure is applied to the spent acid until the rock fractures. In the event that fresh fluophosphoric acid is employed as the pressure transmitting medium, the injected fresh acid will then flow through the fractures produced enlarging them by chemically reacting with the newly exposed siliceous surfaces. The end result will be a large increase in the production rate of the well. In an illustrative but non-limiting example of a typical operation, a total of 25,000 pounds of difluophosphoric acid would be employed in a well that penetrates a sand 100 feet thick. Initially about 5,000 to 15,000 pounds of the acid would be introduced into the borehole at the well head along with the simultaneous introduction of an equal weight of water. These components of the treating solution would commingle within the tubing to produce an acid treating solution of high reactivity. The initial proportion of the treating solution would be forced into the formation by pumping into the tubing a volume of treating solution equal to the capacity of the tubing plus the open holes and allowed to stand until spent. This will require only a few minutes in the case of tight sand with a large surface area but may require an hour or more with loose sands. The remainder of the acid is then pumped into the borehole under a pressure great enough to cause fracturing of the formation containing the spent treating solution. This pressure will vary from about 0.57 to 1.0 times the pressure of the overburden but will usually be about 0.7 the pressure of the overburden. The pressure of the overburden per square inch is the weight of a column of rock 1 inch square in cross-section extending from the formation in question to the surface. This will generally be about 0.95 p. s. i. per foot of depth. The quantity of aqueous acid solution employed will, of course, depend upon the size of the formation being treated. Generally about 10 to 200 barrels of aqueous acid solution will be employed. However, in some instances, it might be required that the quantity of acid solution employed be as high as 400 barrels or more. As it has been taught in the aforementioned copending application, several fluophosphoric acids may be employed. However it is preferred that difluophosphoric acid be employed in carrying out this invention. It will be noted from the table that the most substantial increases in viscosity are experienced in utilizing the higher concentrations of fluophosphoric acids. This is fortuitous for it has been found that in most instances the maximum reactivity of the acid treating agent is obtained when acid treating solutions having about a 50 per cent by weight concentration of fluophosphoric acid are employed. Similarly the presence of spent fluophosphoric acid during the subsequent acidization of the fractures produced by the hydraulic fracturing minimizes the precipitation of insoluble salts which may form from the presence of calcium salts being contacted with the fresh acid treating solution.

This invention also encompasses the use of spent fluophosphoric acid as a fracturing medium for effecting the hydraulic fracturing of rock formations regardless of whether the acid is spent in situ in a formation or as an alternative method for carrying out the instant invention spent fluophosphoric acid solution is obtained from an extrinsic source. This latter method is especially adaptable in fields where a plurality of wells are being treated. In this instance, spent fluophosphoric acid which has been obtained from an adjacent well which has undergone acidization with a fluophosphoric acid treating solution may be transported to the wells in which it is desired to carry out the hydraulic fracturing of a selected formation and used therein as the fracturing medium. Furthermore calcareous formations may also be fractured by employing spent fluophosphoric acid produced in some siliceous environment.

This invention is not only useful as a well completion method for newly completed wells but may also be employed for stimulating the production of producing wells and, in addition, may be used in secondary recovery operations. It is also intended that the instant invention may be employed in the production of fluids other than oil from subterranean reservoirs including water and natural gas.

I therefore claim as my invention:

1. A method for increasing the permeability and porosity of a fluid-containing subterranean reservoir traversed by a borehole which comprises introducing into the reservoir in areas having substantially discontinuous interstices a viscous medium comprising an aqueous solution of a fluophosphoric acid which has been spent by contacting said acid with silica and thereafter applying to said viscous medium a force sufficient to develop within said interstices a pressure in excess of the overburden pressure of said reservoir thereby producing fractures within said reservoir which extend radially from the borehole and increase the production rate and porosity of the reservoir.

2. A method in accordance with claim 1 in which the pressure employed is from about 0.57 to about 1.0 times the overburden pressure of said reservoir.

3. A method in accordance with claim 2 in which the overburden pressure is about 0.7 times the overburden pressure of said reservoir.

4. A method in accordance with claim 1 in which the viscous medium is obtained by employing the non-oleaginous effluent produced by contacting a siliceous formation traversed by a second borehole with an aqueous solution of a fluophosphoric acid for a time sufficient to produce a substantially spent aqueous solution of fluophosphoric acid.

5. A method for increasing the permeabilty and porosity of a fluid-containing subterranean siliceous reservoir traversed by a borehole which comprises forcing into the reservoir an aqueous solution of fresh fluophosphoric acid in an amount sufficient to react with said reservoir and produce an increase in the permeabilty thereof, permitting said solution to remain in contact with said reservoir until the said solution is substantially spent and thereafter applying to the said spent solution a force sufficient to generate into said interstices a pressure 0.57 to 1.0 times the overburden pressure of said reservoir thereby producing fractures within said reservoir which extend radially from the borehole and increasing the production rate and porosity of the reservoir.

6. A method in accordance with claim 5 in which the pressure employed is about 0.7 times the overburden pressure of said reservoir.

7. A method in accordance with claim 5 in which the treating solution initially employed contains 50 per cent by weight of difluophosphoric acid.

8. A method for increasing the permeability and porosity of a fluid-containing subterranean siliceous reservoir traversed by a borehole which comprises introducing into the reservoir in areas having substantially discontinuous interstices an aqueous solution of a fluophosphoric acid in an amount sufficient to react with said reservoir and produce a substantial increase in the permeabilty thereof, allowing said solution to remain in contact with said reservoir until the said solution becomes substantially spent and thereafter applying to said spent solution a force sufficient to generate within said interstices a pressure 0.57 to 1.0 times the overburden pressure of said reservoir, said force being applied by pumping additional quantities of fresh fluophosphoric acid-containing aqeuous solutions into contact with said spent solutions.

9. A method in accordance with claim 8 in which the fresh fluophosphoric acid-containing solutions contain about 50 per cent by weight of fluophosphoric acid.

10. A method in accordance with claim 9 in which the fluophosphoric acid employed is difluophosphoric acid.

11. A method in accordance with claim 8 in which the pressure employed is about 0.7 times the overburden pressure of said reservoir.

DONALD C. BOND.

References Cited in the file of this patent

UNITED STATES PATENTS

| Number | Name | Date |
|---|---|---|
| 1,990,969 | Wilson | Feb. 12, 1935 |
| 2,300,393 | Ayers | Nov. 3, 1942 |
| 2,596,137 | Fast | May 13, 1952 |
| 2,596,843 | Farris | May 13, 1952 |